INVENTOR.
Asa E. Roane
BY
ATTORNEY.

INVENTOR.
Asa E. Roane
BY
ATTORNEY.

United States Patent Office 3,421,576
Patented Jan. 14, 1969

3,421,576
AIR CONDITIONING SYSTEM FOR HEATING, COOLING AND DEHUMIDIFYING AUTOMOTIVE VEHICLES
Asa E. Roane, Cadillac, Mich., assignor to Kysor Industrial Corporation, Cadillac, Mich.
Filed Apr. 6, 1967, Ser. No. 628,896
U.S. Cl. 165—23      12 Claims
Int. Cl. B60h *3/00;* B60h *3/04*

ABSTRACT OF THE DISCLOSURE

The air circulating system includes a radiator for adding engine heat and an evaporator for cooling. A thermostatically controlled inlet introduces outside air. The compressor feeding the evaporator operates at full capacity, and cooling is regulated by a bypass that feeds hot refrigerant to the evaporator. A control responsive to outside temperature automatically shuts off the compressor when it is not needed, and at the same time automatically opens the inlet for the outside air. Manual controls selectively override the thermostatic control of outside air to admit air when desired. Other selective controls actuate the air circulating means and the direction of discharge to accomplish heating, cooling, windshield defrosting, and dehumidifying.

Summary of invention

The invention combines an air circulating system for a vehicle, with the cooling coil of a refrigeration system and a heating coil heated from the engine of the vehicle, arranged in that order in the circulating air, to cool and dehumidify the air and then reheat the air when desired; the system being characterized by an arrangement of controls and an inlet for outside air which permits the system to be selectively operated under conditions for maximum cooling, or cooling with the addition of fresh air or heating, the circulated air being dehumidified in all operating conditions. The controls include an arrangement, in which the cooling coil is maintained at about 32° F., for maximum dehumidification and maximum cooling, and in which the refrigeration system operates continuously until the outside temperature falls to around the dew point. Under the latter condition, the refrigeration system is deactivated, and outside air is automatically introduced and heated with the recirculated air. The invention further provides selectively operable controls for directing the dehumidified air, either cooled or heated relative to the outside temperature, against the windshield of the vehicle to defog or defrost the windshield. The arrangement of the controls is such that outside air will not be admitted when the system is set to defog or defrost the windshield, and when the condition of the outside air would interfere with the desired defogging or defrosting of the windshield. Under all operating conditions of the system, the addition of heat to the circulating air is under the control of an adjustable thermostat that senses the temperature of the air leaving the system, and admits or withholds heat from the engine to keep the temperature of the circulated air at the desired level selected by the operator.

The drawings of which there are two sheets illustrate the arrangement of the several operating parts of the system, and the controls therefor.

Figure 1:
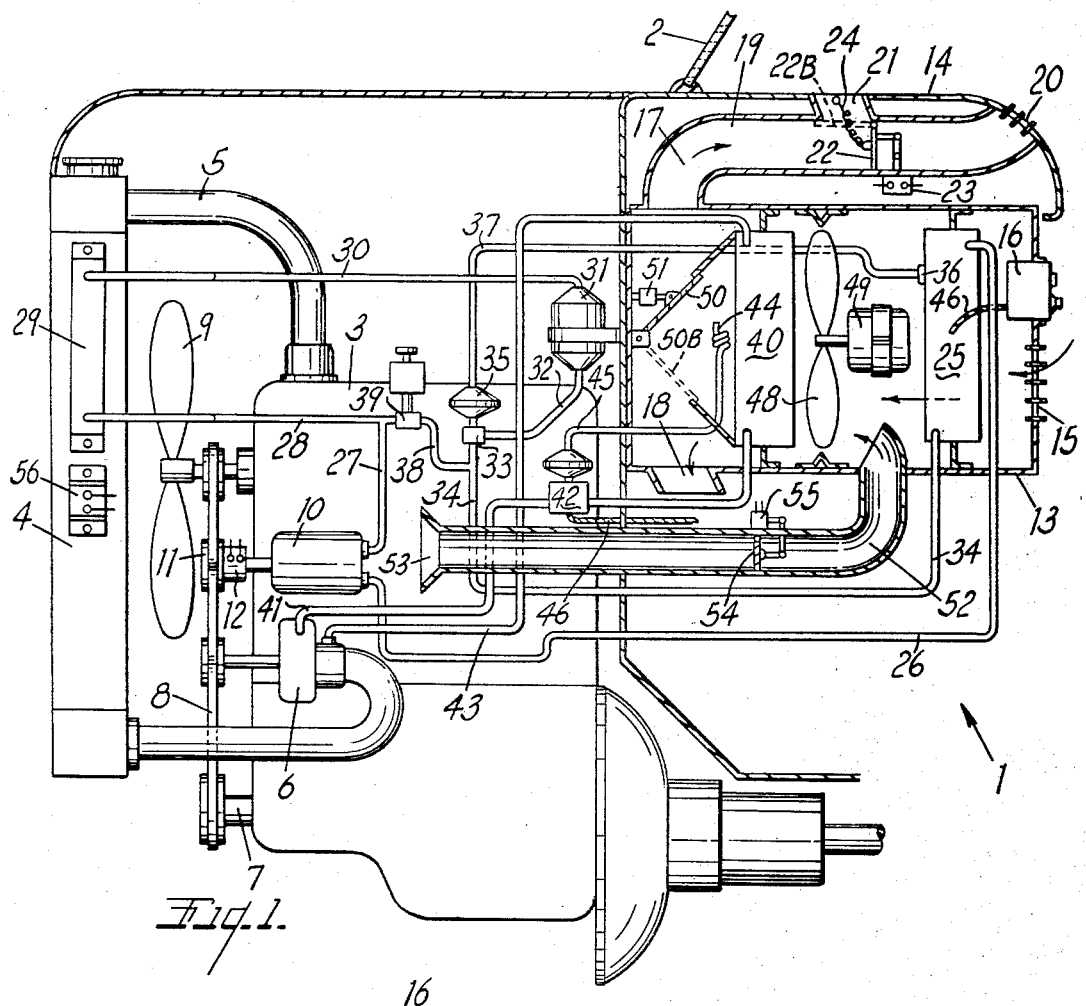
FIGURE 1 is a fragmentary, vertical longitudinal, cross sectional view through an automotive vehicle; conventionally illustrating the cooperating parts of the vehicle and the system of the invention.
Figure 2:
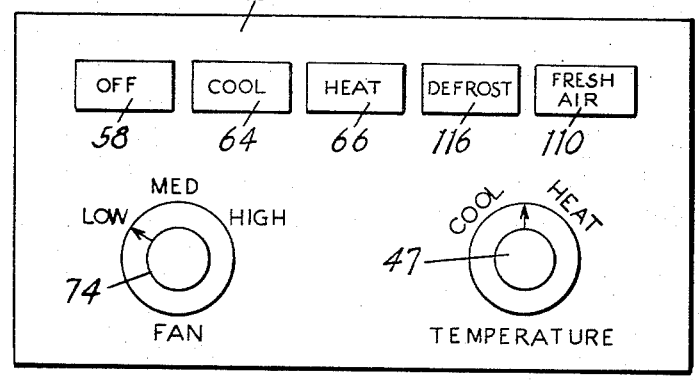
FIGURE 2 is a view of the control panel and the selectively operable controls of the air conditioning system.

The air conditioning system of the invention is applicable to automobiles and trucks having internal combustion engines which develop excess heat which may be utilized in the air conditioning system. In FIGURE 1 there is conventionally illustrated part of such a vehicle having a passenger or driver's compartment 1 with a windshield 2. A liquid cooled internal combustion engine is indicated at 3. The engine has the usual coolant radiator 4 connected thereto by the hose 5. A coolant or "water" pump 6 circulates coolant from the radiator through the cooling passages of the engine. The pump is driven from the engine crankshaft 7 by a belt 8 which may also drive the usual fan 9.

A refrigerant compressor 10 is arranged to be driven by power from the engine, as by having a drive pulley 11 engaged and driven by the belt 8. Operation of the compressor is under the control of an electrically actuated control such as the magnetic clutch 12.

Conditioning of the air in the compartment 1 is effected in a box or enclosure formed by the walls 13 and shown mounted under the cowl 14 of the vehicle. The enclosure has a return air inlet 15 from the passenger compartment. A box 16 for the manual controls of the system is mounted in the wall of the enclosure facing the driver. At its forward end, the enclosure is provided with an upwardly delivering outlet 17, and a downwardly delivering outlet 18. The upwardly delivering outlet delivers cooled air through the duct 19 to a main delivery grille 20. A branch conduit 21 opening from the duct 19 is arranged to deliver air against the inside of the windshield. The flow of air from the duct 19 is controlled relative to the main grille 20 and the branch conduit 21 by an air flow control valve or damper 22. The damper 22 is arranged to be moved to the full line position shown by energization of an electrical actuating device such as the solenoid coil conventionally shown at 23. The damper valve is biased and returned to the dotted line position 22B as by a spring 24. As will be described presently, duct 19 also carries heated air when the valve 22 is in the full line position illustrated.

Positioned directly ahead of the return air inlet 15 where it is first to engage the returned air, is a cooling coil or evaporator 25. The evaporator is connected in the refrigerating circuit with the compressor by a return or low pressure conduit 26. The high pressure side of the compressor is connected by a conduit 27–28 to a condenser 29 positioned alongside the radiator in the airstream of the fan 9. From the condenser 29, a conduit 30 delivers to a receiver 31, and a conduit 32 delivers from the receiver to a thermostatically controlled expansion valve 33. The valve 33 delivers through the conduit 34 to the inlet of the evaporator. The temperature responsive control 35 of the valve 33 is actuated in response to the temperature of the evaporator, as by the sensing device and control tube shown conventionally at 36 and 37 respectively.

In addition to the main refrigerant circulating circuit just described, there is provided a bypass conduit 38 connected between the conduits 27 and 34. Flow through the conduit 38 is controlled by a pressure responsive valve 39. The adjustment or settings of the valves 33 and 39 will be described presently.

Positioned forwardly in the enclosure 13 and in spaced relation to the evaporator 25, is a heater coil or radiator 40. A coolant supply conduit 41 delivers hot engine coolant from the cooling system of the engine to the heater coil. The amount of hot coolant delivered is controlled by the adjustable, temperature responsive valve 42. Coolant is returned from radiator to the pump or engine by the conduit 43. The valve 42 is regulated by the temperature of a sensing device 44 positioned in the stream of air issuing from the heater coil. The sensing device is connected to actuate the valve, as by the connecting tube 45. The temperature at which the valve 42 will be opened or closed by action of the sensing device 44 may be adjusted by a manual control exemplified by the flexible cable 46 extending from the valve to a temperature selecting control knob 47 mounted on the control box 16.

A fan 48 driven by the motor 49 provides forced air circulation from the compartment 1, through the evaporator and the heating coil and back to the compartment. The flow of air out of the enclosure is controlled by a second air flow control valve or damper 50. The damper 50 is moved to the full line position illustrated by energization of an electrical control such as the solenoid coil 51. In this position, all air is circulated downwardly through the outlet 18. The damper 50 is biased to the lower dotted line position 50B by weight or spring means. In the de-energized condition of the solenoid coil 51 and the lowered position of the damper, all air is circulated up through the outlet 17.

Opening to the enclosure 13 between the cooling coil 25 and the heating coil 40 is a fresh air inlet tube or conduit 52. The tube picks up outside air through a scoop 53 opening exteriorly of the compartment 1. Flow of fresh air through the tube is regulated by a third air flow control valve or damper 54. The damper is biased to the full line closed position illustrated by weight, spring or other means, and is moved to open position by energization of electrical actuating means such as the solenoid coil 55.

The controls for the system include an outside temperature sensing device in the form of a thermostatically actuated switch indicated generally at 56. The switch is located to respond to changes in the temperature of the outside air. As appears more clearly in the circuit diagram in FIGURE 3, the switch is of the three conductor type arranged to make one contact upon breaking another.

Figure 3:
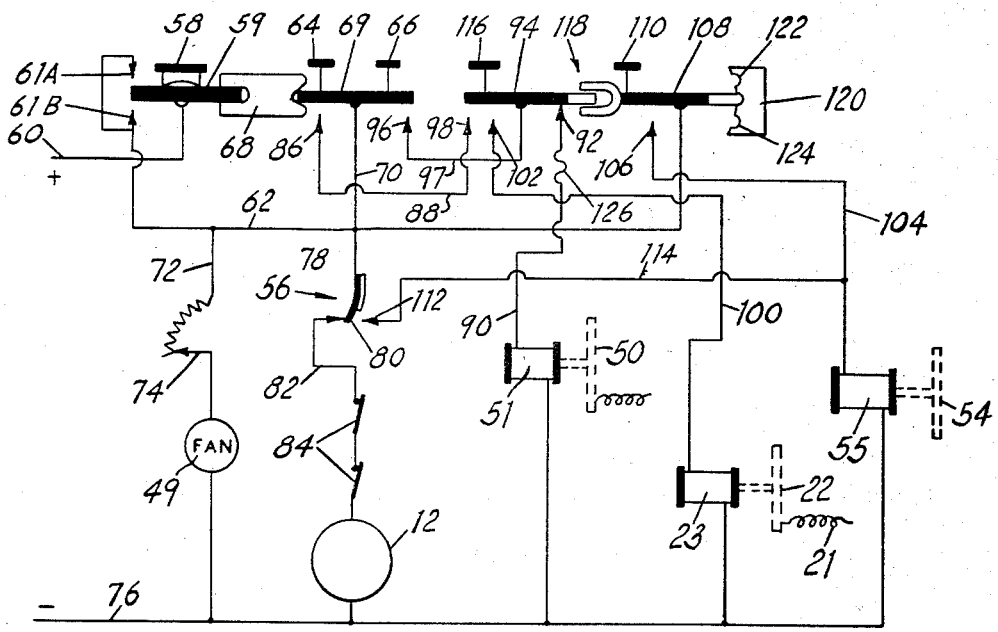
FIGURE 3 is a schematic wiring diagram of the electrical controls of the system.
Figure 4:
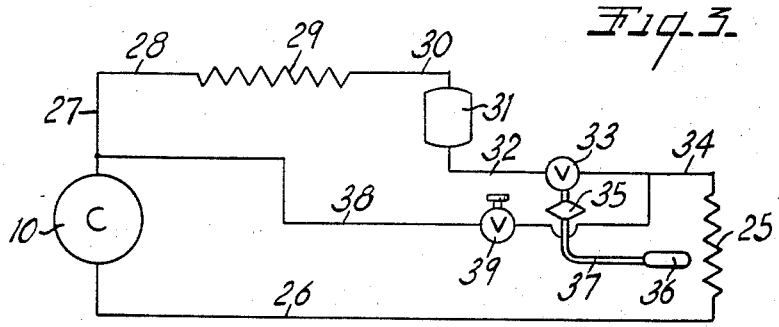
FIGURE 4 is a schematic diagram of the refrigeration circuit of the system.
Figure 5:
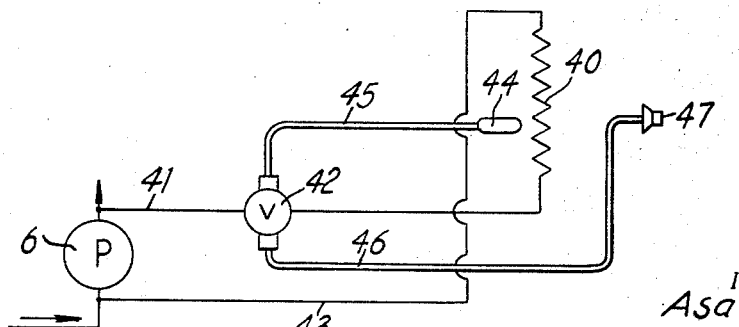
FIGURE 5 is a schematic diagram of the heating elements and controls of the system.

With particular reference to the circuit diagram in FIGURE 3, the arrangement and operation of the electrical and selectively operable controls, and the operation of the system is as follows:

The "Off" control buttom 58 and switch bar 59 mechanically disengages the supply conductor 60 from alternate terminals 61A and 61B of a main energizing conductor 62. The "Cool" selector button 64 and the "Heat" selector button 66 are each arranged to connect the main energizing conductor 62 to the supply. In the example illustrated, this is effected by a mechanical inter-lock 68 between the switch bar 59 and a switch bar 69. The bar 69 pivots about a central connection to a conductor 70, and pushing or actuating either the "Cool" or "Heat" selector buttons moves bar 59 into contact with one or the other of terminals 60A or 60B.

Energization of the main conductor 62, in both selected conditions of the system, completes energizing circuits to both the fan motor 49 and the compressor control clutch 12. The fan motor circuit extends through conductor 72 and a speed selector switch or rheostat 74 connected to the motor. The motor is permanently connected to the return conductor 76 of the power source. A conductor 78 connects the main energizing conductor 62 to the movable contact 80 of the ambient sensor switch 56. The switch 56 is set to close on a terminal of conductor 82 at temperatures above the dew point of air at the operating temperature of the condenser, say 45° F. to 50° F. The conductor 82 extends through over-load or safety switches 84 for the compressor to the clutch 12, and the other side of the clutch is connected to the return conductor 76.

*Cooling operation*

Assuming the condition of outside air, plus the heat load added to the compartment, creates a demand for cooling, button 64 is pressed to energize terminal 86 of conductor 88 (and also close switch bar 59 on terminal 61A). Without further operation of the controls, the fan and compressor operate to provide maximum cooling of recirculated air. The circuit to solenoid 51 extends through conductor 90, terminal 92 and switch bar 94. Switch bar 94 is de-energized due to the open condition of switch bar 69 and terminal 96 of conductor 97, and also due to the open condition of switch bar 94 relative to terminal 98 of conductor 88. The air valve 50 accordingly assumes its downward biased position shown at 50B in FIGURE 1 and cool air is directed upwardly through outlet 17. The energizing circuit to solenoid 23, through conductor 100 is broken at terminal 102, so air valve 22 assumes its spring biased position 22B in FIGURE 1 and cool air is directed through the grille opening 20. The energizing circuit to solenoid 55 through conductor 104 is open between terminal 106 and the deactuated position of switch bar 108 as illustrated. Air valve 54 accordingly assumes its deactuated or biased closed position shown in full line in FIGURE 1, and outside air is excluded.

If, under the foregoing condition, the operator desires to add fresh air, he may press the "Fresh Air" control button 110 to complete an energizing circuit to solenoid 55 through the main energizing conductor 62, switch bar 108, terminal 106 and conductor 104. This opens fresh air valve 54.

During conditions for both the maximum cooling, and the lesser cooling with the addition of fresh air, just described, the compressor will operate continuously; while the operation of the valves 33 and 39 maintain the evaporator at a temperature just above the frost point for maximum dehumidification. Should the temperature of the air leaving the outlet 17, as sensed by the sensing element 44, fall below the temperature selected by the manual control 47 for the valve 42, the valve will open to admit hot engine coolant to the heater core 40 and reheat the air cooled by the evaporator. Should the temperature (and volume) of the air returned to the evaporator fall below that which requires the full cooling capacity of the compressor, the operation of valves 33 and 39 of the refrigerant system will function to bypass hot refrigerant to the evaporator. Stated another way, if the heat load of the recirculated air falls below that necessary to raise the temperature of the refrigerant in the evaporator corresponding to the predetermined superheat of the refrigerant at the frost point, the valve 39 will bypass hot refrigerant to maintain a constant temperature and superheat in the evaporator. In effect the load on the compressor is automatically reduced (or increased) by varying its back pressure, while the compressor operates continuously.

*Heating operation*

Assuming conditions where the temperature of the outside air gives rise to a requirement for added heat, the operator presses the "Heat" selector button to close switch bar 69 on terminal 96. The fan 49 is energized as before; and assuming an outside temperature above the dew point, the compressor is activated by energization of the clutch through sensing switch 56. A circuit is completed from main energizing conductor 62, conductor 70, switch bar 69, terminal 96, conductor 97, switch bar 94, terminal 92 and conductor 90 to the operating solenoid 51. This moves air valve 50 to the full line position shown in FIGURE 1, and air will be directed downwardly through outlet 18. The temperature selector control 47 will be set to the desired, and presumably higher, setting so that sensing element 44 actuates the engine coolant control valve 42 to admit more hot coolant to the heater core or radiator 40. The refrigeration system continues to operate as previously described, to hold the evaporator at about the frost point. It is apparent that the refrigeration system will tend to operate at maximum capacity due to the higher temperature of the air returned to the evaporator. This provides maximum dehumidification.

If the temperature of the outside air as sensed by the switch 56 falls below the dew point of air at the temperature of the evaporator, the evaporator and compressor are no longer needed; so switch 56 is set so that its movable terminal 80 shifts from contact with the conductor 82, into contact with a terminal 112 connected by the conductor 114 with the conductor 104 and the fresh air control solenoid 55. Clutch 12 is deenergized, stopping the compressor; and fresh air valve 54 is opened automatically to admit the cooler outside air. Temperature sensing element 44 and valve 42 continue to regulate the admission of hot engine coolant to the radiator 40 to fill the temperature requirement set by control 47.

Note that fresh air may be selectively admitted while the system is operating under heating conditions, by depressing the "Fresh Air" button 110. This completes the energizing circuit to the solenoid coil 55, independently of the outside temperature sensing switch 56, and fresh air will be admitted before the switch 56 operates. The switch 56 will still function to deactivate the compressor at the predetermined outside temperature as before.

*Defrost operation*

Defrosting of the windshield is normally associated with cold outside temperatures at which the system will be set for "Heat" operation with the "Heat" button 66 depressed, as explained above. When desired, "Defrost" button or control 116 is depressed, bringing switch bar 94 into contact with terminal 102 of conductor 100. Since switch bar 94 is energized from conductor 97 and terminal 96 closed on switch bar 69 in the "Heat" position of the latter, an energizing circuit is established to solenoid 23 through conductor 100. This moves air valve 22 to the full line diverting position shown in FIGURE 1. At the same time, the opposite or right end of switch bar 94 is moved out of contact with terminal 92. This breaks the energizing circuit to conductor 90 and solenoid 51, so air control valve 50 is returned to its biased position 50B. Heated and dehumidified air is then directed upwardly and through the defrost outlet 21 against the windshield.

*Defogging operation*

Conditions of high outside humidity may occur at median temperatures when either heating or cooling are desired, and it may be desired to direct dehumidified air through the defrost outlet 21 when the system is operating under cooling conditions, with switch bar 69 closed on terminal 86 and opened from terminal 96. Under these conditions, depressing the "Defrost" button completes an alternate energizing circuit from terminal 86 through conductor 88, terminal 98, switch bar 94 and terminal 102 to conductor 100 and solenoid 102. The air direction control valve 22 thus remains actuated to "defrost" or "defog" position, and air direction control valve 50 remains in unactuated condition to direct air through outlet 17, due to opening the connection between switch bar 94 and terminal 92. The system then operates to deliver air against the windshield which is primarily dehumidified but which may also be cooled relative to the outside air.

Since the conditions which give rise to a demand for "defogging" plus cooling presuppose a high outside humidity, it would defeat the purpose, or unnecessarily load the system to admit outside air under these conditions. Accordingly the apparatus includes an interlock, indicated conventionally at 118, between the switch bars 94 and 108. Depressing or actuating the "Defrost" button moves the "Fresh Air" button and switch bar to deactuated, open, position. Thus, warm air cannot be introduced when the system is set for cooling and defrosting. The "Defrost" button functions as a return or deactivating control for the "Fresh Air" button, and vice versa. A neutral or "off" position of both controls is determined by the detent plate 120. The controls are shown in FIGURE 3 in a neutral-off position, and plate 120 has a fresh air "on" detent 122, and a defrost "on" detent 124. The switch bar 94 engages the terminal 92 in the neutral position of the controls and provision is made for continuing the contact in the fresh air "on" position, as is indicated by the springable section 126 of the terminal 92. However, the movement permitted by the springable section is insufficient to prevent breaking the contact between the switch bar 94 and terminal 92 when the "Defrost" button is actuated or depressed.

The controls illustrated are intended to be examples only, and variations thereof are possible, without departing from the scope and theory of the invention as defined in the following claims.

What is claimed as new is:

1. An air conditioning and control system for a vehicle having a passenger compartment with a windshield, and a liquid cooled internal combustion engine mounted externally of said compartment with an engine driven pump for circulating cooling liquid through said engine,
   said system comprising a refrigerant compressor mounted to be driven by said engine,
   a refrigerant condenser,
   an electrically actuated driven connection arranged when energized to connect said compressor to said engine,
   a housing in said compartment having a return air opening from the compartment,
   a fan arranged to draw air through said return air opening and force the air out of said housing,
   an upwardly directed outlet and a downwardly directed outlet opening from said housing,
   a direction control damper valve arranged to selectively direct air through said outlets,
   a refrigerant evaporator and an engine coolant radiator mounted in spaced successive heat exchange relation in said housing with the evaporator engaged first by air drawn through said housing,
   an outside air duct arranged to introduce outside air to said housing between said evaporator and said radiator,
   a shut-off damper valve arranged to close said outside air duct,
   a coolant circulating conduit having a thermostatically controlled valve therein and connected to circulate hot engine coolant from said pump through said radiator, said valve being responsive to the temperature of air passed through said radiator,
   a refrigerant circuit including a return conduit from said evaporator to said compressor, a first outlet conduit from said compressor to said condenser, a receiver connected to the outlet of said condenser, an expansion valve connected between said receiver and the inlet of said evaporator, and a second outlet from said compressor having a second expansion valve therein and connected to said evaporator independently of said first expansion valve,
   said expansion valves being arranged to hold said evaporator at a low temperature between 30° and 40° when said compressor is operating,
   a selectively operable switch movable between an open position and two opposite closed positions, each of said closed positions being connected to energize a main conductor,
   a temperature sensitive switch responsive to ambient temperature around said vehicle connected in series between said main conductor and said electrically actuated drive and arranged to disengage said drive when the ambient temperature falls to below 50°,
   said fan being connected to be energized by said main conductor, a first electrical control connected to move said direction control damper valve to direct air downwardly when the first control is actuated, a second electrical control connected to move said shut-off damper valve to open position when the second electrical control is actuated, a second selectively operable switch connected to said main conductor and movable between an open position and alternative heat and cool positions, a third selectively operable switch closeable in series connecting relation with said first electrical control, said second selectively operable switch being arranged to connect said third switch to said main conductor in the heat position of the second switch, a fourth selectively operable switch connected to said main conductor and closeable in series with said second electrical control, and a circuit connected in series with said second electrical control and in parallel with said fourth switch, said last circuit being connectable to said main conductor by said temperature responsive switch when the latter is opened in said circuit with said electrically actuated drive.

2. An air conditioning and control system as defined in claim 1 in which said upwardly directed outlet from said housing is divided into a cooling outlet and a defrost outlet directed toward said windshield, a defrost damper valve movable to direct air alternatively through said cooling outlet and said defrost outlet, a third electrical control connected to move said defrost damper valve to direct air through said defrost outlet when the control is actuated, a contact connected in series with said third electrical control and arranged to be engaged and energized from said third switch when the third switch is opened in its series connection with said second electrical control, and a conductor having terminals on its ends arranged to be engaged by said second switch in the cool position of that switch and by said third switch in which the latter is engaged with said contact connected in series with said third electrical control.

3. An air conditioning and control system as defined in claim 2 in which said electrical controls are solenoids arranged to actuate said damper valves when the solenoids are energized, said damper valves being biased to unactuated positions.

4. An air conditioning and control system as defined in claim 3 in which said drive connection for said compressor is an electric clutch, a variable resistance speed control connected in series with said fan, and means for selectively adjusting said thermostatically controlled valve in the coolant conduit of said radiator.

5. An air conditioning and control system as defined in claim 4 in which there is a mechanical interlock between said first and second selectively operable switches by which movement of the first switch to off position moves the second switch to off position, and movement of the second switch to either heat position or cool position moves the first switch to on position, and a second mechanical inter-lock connected between said third and fourth switches to open said fourth switch when said third switch is opened in the series connection to said first electrical control.

6. An air conditioning system for vehicles having a passenger compartment with a windshield and an internal combustion engine, said system comprising, a refrigerant compressor having an electrically actuated control, arranged when energized, to drivingly connect said engine to said compressor, a condenser, a receiver, a temperature responsive expansion valve and an evaporator connected in circulating series with said compressor, a bypass conduit connected between the outlet of said compressor and said evaporator with a pressure responsive valve connected in series between the compressor and the evaporator, said temperautre responsive valve being responsive to the temperature of said evaporator and both said valves being adjusted to hold said evaporator slightly above 32° F. at the full capacity of said compressor, an enclosure in said compartment having a return air inlet and upwardly and outwardly directed outlets, said evaporator being positioned in heat transfer relation in said compartment, a radiator positioned in following spaced relation to said evaporator in the airstream through said enclosure, means for transferring heat from said engine to said radiator, means for forcing air through said enclosure, means for introducing air from outside said vehicle to said enclosure on the downstream side of said evaporator, adjustable heat regulating means responsive to the temperature of air leaving said enclosure connected to regulate said means for transferring heat, a first air flow control member adjustable to selectively direct air from said enclosure through said upwardly directed outlet or said downwardly directed outlet, a second air flow control member adjustable to selectively block or open said means for introducing outside air, first electrical control means having alternatively actuated heat and cool positions to condition said system for heating or cooling and connected to energize said means for forcing air through said enclosure and to energize the electrically actuated control to drive said compressor in both of its actuated positions, second electrical control means arranged when energized to adjust said first air flow control member to direct air through the downwardly directed outlet from said enclosure, said second control means being connected to be energized by said first electrical control means in the heat actuated position of the latter, third electrical control means arranged when energized to open said second air flow control member, and a sensing switch subjected to the temperature of air outside of said vehicle, said sensing switch being arranged to close in energizing series with the electrically actuated control of said compressor to drive said compressor at outside air temperatures above the dew point at the temperature of said evaporator, said sensing switch being connected to open its energizing connection to said electrically actuated control and to close in an alternate energizing series circuit with said third electrical control means at outside air temperatures below the dew point at the temperature of said evaporator.

7. An air conditioning system as defined in claim 6 in which there is a selectively operable defrost switch connected in series with said second electrical control means and closed in the deactuated condition of the defrost switch, a branch outlet opening from said upwardly directed outlet from said enclosure and directed against said windshield, a third air flow control member adjustable to selectively direct air through said branch outlet or through the main upwardly directed outlet, a fourth electrical control means connected, when energized, to move said third air flow control member to direct air through said branch outlet, said fourth electrical control means being connected to be energized through said defrost switch, and alternate energizing circuits connected to said defrost switch, with one of the alternate circuits energizing the switch in the heat position of said first electrical control means and with the other of the alternate circuit arranged to energize the switch in the cool position of said first electrical control means and the actuated position of the defrost switch.

8. An air conditioning system as defined in claim 7 in which there is a fresh air switch connected to close, when actuated, in series between said second air flow control member and the circuits energized in both actuated positions of said first electrical control means.

9. An air conditioning system as defined in claim 8 in which there is a mechanical interlock between said fresh air switch and said defrost switch arranged to open the defrost switch when the fresh air switch is closed, and to open the fresh air switch when the defrost switch is closed.

10. An air conditioning system for vehicles having a passenger compartment with a windshield and an internal combustion engine, said system comprising, a refrigerant compressor having an electrically actuated control, arranged when energized, to drivingly connect said engine to said compressor, a condenser, a receiver, a temperature responsive expansion valve and an evaporator connected in circulating series with said compressor, a bypass conduit connected between the outlet of said compressor and said evaporator with a pressure responsive valve connected in series between the compressor and the evaporator, said temperature responsive valve being responsive to the temperature of said evaporator and both said valves being adjusted to hold said evaporator slightly above freezing at the full capacity of said compressor, an enclosure in said compartment having a return air inlet from the compartment and upwardly and downwardly directed outlets, said evaporator being positioned in heat transfer relation in said compartment, a radiator positioned in following spaced relation to said evaporator in the airstream through said enclosure, means for transferring heat from said engine to said radiator, means for circulating air through said compartment and said enclosure, controllable means for introducing air from outside said vehicle to said enclosure on the downstream side of said evaporator, adjustable heat regulating means responsive to the temperature of air leaving said enclosure connected to regulate said means for transferring heat from said engine to said radiator, a temperature sensitive control arranged to be responsive to the temperature external to the vehicle, a selectively operable control movable to heat and cool positions and connected in each of said positions to actuate both said electrically actuated controls to drive said compressor and said means for circulating air through said enclosure, automatically operable control means connected to direct air through said upwardly directed outlet when said selectively operable control is in cool position, and alternatively through said downwardly directed outlet when said selectively operable control is in heat position, said temperature sensitive control being connected to interrupt said electrically actuated control connecting said compressor to said engine, and simultaneously actuate said means for introducing air from outside vehicle, when the temperature of the outside air is approximately at or below the dew point at the temperature of said evaporator, and first selectively operable means connected to actuate said means for introducing air from outside said vehicle, said last means being operative in both the heat and cool positions of said selectively operable control and independently of said temperature sensitive control.

11. An air conditioning system as defined in claim 10 in which there is a branch passage from said upwardly directed outlet arranged to direct air against said windshield, and a second selectively operable means, effective in both the heat and cool positions of said selectively operable control, connected to direct air through said branch passage, said second selectively operable means being connected to deactivate the alternative portion of said automatically operable control means for directing air through said downwardly directed outlet.

12. An air conditioning system as defined in claim 11 in which there is an interlock between said first selectively operable means and said second selectively operable means, arranged to deactivate said first selectively operable means when said second selectively operable means is actuated to direct air through said branch passage.

References Cited

UNITED STATES PATENTS

| | | | |
|---|---|---|---|
| 2,344,215 | 3/1944 | Soling et al. | 62—196 |
| 3,183,962 | 5/1965 | Steinhagen et al. | 165—42 XR |
| 3,263,739 | 8/1966 | Gaskill et al. | 165—44 XR |
| 3,315,730 | 4/1967 | Weaver et al. | 165—23 |

ROBERT R. O'LEARY, *Primary Examiner.*

M. A. ANTONAKAS, *Assistant Examiner.*

U.S. Cl. X.R.

165—42